(12) United States Patent
Braman et al.

(10) Patent No.: US 7,869,220 B2
(45) Date of Patent: Jan. 11, 2011

(54) STIFFENING SUPPORT FOR PRINTED CIRCUIT ASSEMBLIES

(75) Inventors: Todd L. Braman, New Brighton, MN (US); Dale Hagenson, East Bethel, MN (US); Jacob Weinmann, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 343 days.

(21) Appl. No.: 12/180,227

(22) Filed: Jul. 25, 2008

(65) Prior Publication Data

US 2010/0020511 A1    Jan. 28, 2010

(51) Int. Cl.
    *H05K 7/12* (2006.01)
(52) U.S. Cl. .................. 361/752; 361/807; 174/520
(58) Field of Classification Search .......... 361/730, 361/752, 767, 807, 809, 808; 174/520
    See application file for complete search history.

(56) References Cited

U.S. PATENT DOCUMENTS

| | | | |
|---|---|---|---|
| 3,918,052 A | 11/1975 | Bricher | |
| 6,166,553 A * | 12/2000 | Sinsheimer | 324/754 |
| 6,362,978 B1 * | 3/2002 | Boe | 361/825 |
| 6,420,885 B1 * | 7/2002 | Fredrickson | 324/754 |
| 6,462,955 B1 * | 10/2002 | Roberts | 361/760 |
| 6,512,678 B2 * | 1/2003 | Sims et al. | 361/759 |
| 6,771,517 B2 * | 8/2004 | Crapisi et al. | 361/829 |
| 6,777,629 B2 | 8/2004 | Lane et al. | |
| 6,836,020 B2 | 12/2004 | Cheng et al. | |
| 6,853,205 B1 * | 2/2005 | Cheng et al. | 324/754 |
| 6,894,523 B2 * | 5/2005 | Neeb | 324/765 |
| 6,943,292 B2 * | 9/2005 | Dingman | 174/535 |
| 7,092,539 B2 * | 8/2006 | Sheplak et al. | 381/114 |
| 7,382,946 B2 | 6/2008 | Oggioni et al. | |
| 7,471,078 B2 * | 12/2008 | Hobbs et al. | 324/158.1 |
| 2002/0149070 A1 | 10/2002 | Sheplak et al. | |
| 2003/0034239 A1 | 2/2003 | Chason et al. | |
| 2004/0141421 A1 | 7/2004 | Cheng et al. | |
| 2005/0162389 A1 | 7/2005 | Obermeyer et al. | |
| 2006/0093259 A1 | 5/2006 | Oggioni et al. | |
| 2008/0069494 A1 | 3/2008 | Oggioni et al. | |

* cited by examiner

*Primary Examiner*—Dameon E Levi
(74) *Attorney, Agent, or Firm*—Fogg & Powers LLC

(57) ABSTRACT

A packaging assembly includes a printed circuit assembly coupled to a stiffening device, which may take the form of a custom-shaped stiffening member or take the form of a support member having spokes attached to a rim. The printed circuit assembly includes a printed circuit board with a number of electrical components extending from a surface of the board. The stiffening member or the support member includes openings that receive the electrical components while providing additional stiffness to the board.

16 Claims, 3 Drawing Sheets

STIFFENING SUPPORT FOR PRINTED CIRCUIT ASSEMBLIES

BACKGROUND OF THE INVENTION

Microelectromechanical systems (MEMS) and the one or more sensors often located therein, as well as printed wiring boards, which may or may not be formed in conjunction with the MEMS, often have to endure harsh environments, such as being located in a guided projectile, which in turn may be subjected to high thermal and mechanical stresses. U.S. Pat. No. 6,777,629 and U.S. Patent Publication No. 2003/0034239 disclose meso-scale MEMS devices fabricated within the context of a printed wiring board.

For the above-noted systems, boards, and applications, as well as others, it is often desirable to provide additional stiffness by securing the board to a rigid structural member, by potting the printed wiring board, or by including one or more layers of a carbon composite product such as a STABLCOR® carbon composite product within the board. These stiffening methods may have various drawbacks, for example they may not provide an optimal amount of stiffness-to-weight or stiffness-to-volume ratio. Further, the potting method, for example, may adversely affect the electrical components on the board.

SUMMARY OF THE INVENTION

The present invention generally relates to a packaging system for a printed circuit board assembly that may be employed in a sensor, navigational system, or some other instrument where deflection of the board should be minimized. In one aspect of the invention, a packaging assembly includes a printed circuit board having first board surface separated by a second board surface to define a board thickness. A number of electrical components extend from at least one of the first and second surfaces of the printed circuit board to form a printed circuit assembly. Further, at least one of the electrical components may define a maximum board height for the printed circuit assembly. A support member is coupled to the printed circuit assembly and includes a central hub coupled to a rim through a plurality of spokes having spaces located therebetween. The spaces between the spokes are arranged to receive the plurality of electrical components of the printed circuit assembly without interfering with the electrical components.

In another aspect of the invention, a packaging assembly includes a printed circuit board having first board surface separated by a second board surface to define a board thickness. A number of electrical components extend from at least one of the first and second surfaces of the printed circuit board to form a printed circuit assembly. And, a stiffening member is coupled to the printed circuit assembly and includes a plurality of stiffening ribs arranged around openings configured to receive at least one of electrical components of the printed circuit board.

BRIEF DESCRIPTION OF THE DRAWINGS

Preferred and alternative embodiments of the present invention are described in detail below with reference to the following drawings.

DETAILED DESCRIPTION OF ONE EMBODIMENT

The present invention is generally directed to a packaging system for a MEMS device supported by one or more printed wiring boards, hereinafter referred to as the MEMS assembly. The printed wiring boards may or may not be formed simultaneously or contemporaneously with the MEMS. In either embodiment, the packaging system operates to provide at least some additional stiffness to the MEMS assembly. The additional stiffness may be added in a number of ways as will be described in greater detail below. Briefly, however, the packaging system may include a support member nested around the electrical components of the printed wiring boards to improve an overall stiffness of the boards while taking advantage of unused space on the board and unused space associated with the support member. The support member may take the form of a rim and hub assembly—the hub coupled to the rim with a plurality of spokes or may take the form of a carbon composite frame system. The arrangement and sizing of the support member and the electrical components on the boards may achieve a desired mass moment of inertia for the overall packaging system. Additionally or alternatively, the arrangement and sizing of the support member and the electrical components on the boards may achieve a desired amount of frequency separation, specifically maximizing the resonated frequencies of the printed wiring boards with respect to a critical frequency of the MEMS sensor.

A printed circuit board is used to structurally support and electrically connect electronic components using conductive pathways, or traces, etched from metallic sheets, such as copper sheets, laminated onto a non-conductive substrate. Most printed circuit boards are made by bonding a layer of copper over the entire substrate, sometimes on both sides, removing any unwanted copper after applying a temporary mask (e.g., by etching), and then leaving only a desired number of copper traces. Other printed circuit boards are made by adding traces to the bare substrate (or a substrate with a very thin layer of copper) usually by a complex process of multiple electroplating steps. Some of the more common "subtractive" methods for removing the copper are called silk screen printing, photoengraving, and milling.

After the printed circuit board is fabricated, the electronic components are attached to form a functional printed circuit assembly. In one embodiment, the electronic components are attached using through-hole construction, in which component leads are inserted in holes. In another embodiment, the electronic components are attached using surface-mount construction, in which the components are placed on pads or lands on the outer surfaces of the board. In types of assembly, component leads may be electrically and mechanically fixed to the board with a molten metal solder.

Figure 1:
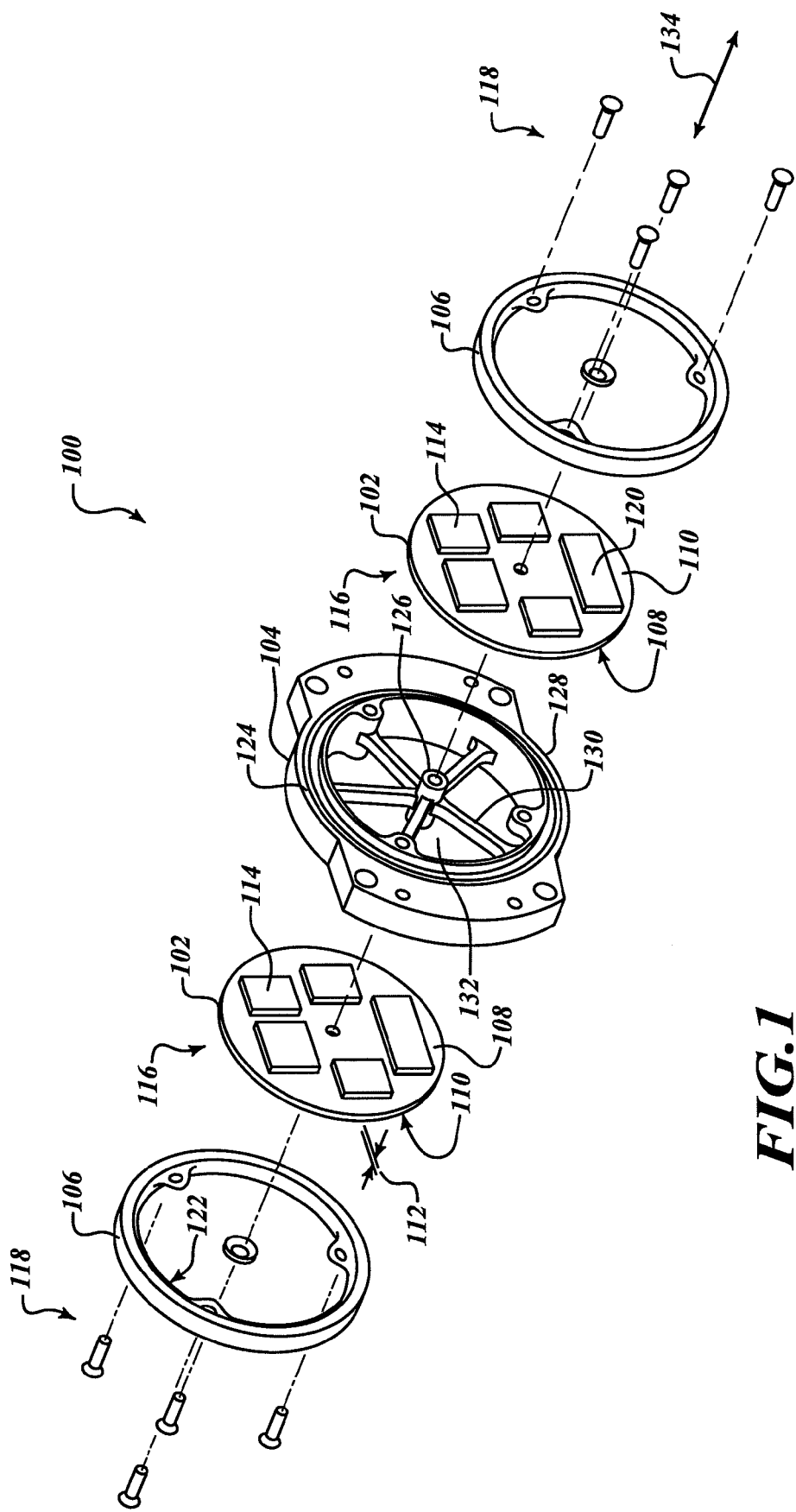
FIG. 1 is an isometric, exploded view of a packaging assembly having printed circuit boards coupled to a support member according to an embodiment of the invention.

FIG. 1 shows an electrical packaging assembly 100 having printed circuit boards 102, a support member 104 and retaining rings 106 according to an illustrated embodiment. Each printed circuit board 102 includes a facing surface 108 offset by a non-facing surface 110 in which these surfaces define a board thickness 112. The boards 102 have a number of electrical components 114 formed on and extending from one or both surfaces 108 and 110 to form a printed circuit assembly 116. Each of the boards 102 may be referred to as having a maximum board height determined as the largest distance from the furthest extending electrical component 114 to its proximate board surface 108 or 110.

In the illustrated embodiment, the retaining rings 106 are coupled to the support member 104 with fasteners 118 and the printed circuit assemblies 116 are located therebetween. The printed circuit assemblies 116 may include a perimeter region 120 sized to receive a perimeter edge surface 122 of the retaining ring 106 and a corresponding perimeter edge surface 124 of the support member 104.

In one embodiment, the support member 104 includes a central hub 126 coupled to a rim 128 with a plurality of spokes 130 having spaces 132 located between the spokes. The spaces 132 are arranged to receive the electrical components 114 of the printed circuit assemblies 116 without interfering with the electrical components 114. The spokes 130, likewise may be configured to abut desired portions of the printed circuit boards 102 such that once the boards 102 are coupled to the support member 104, the spokes 130 operate to structurally support the boards 102, in particular in an out-of-plane direction generally indicated by arrow 134. It is appreciated, however, that not only can he spokes 130 be contoured, shaped and oriented to fit between the electrical components 114, but the electrical components 114 may also be selectively placed on the boards 102 to cooperate with a desired spoke layout.

By way of example, the arrangement of the spokes 130 operates to minimize board bending and may improve or even maximize a frequency separation between the printed circuit assembly 116 and a MEMS sensor (not shown) without increasing an overall package volume of the packaging assembly 100. Hence, the arrangement of the spokes 130 and spaces 132 utilizes space within the support member 104 without requiring additional volume for other stiffening devices. In one embodiment, an operating frequency of the package assembly 100 may be substantially the same or only slightly different than a sensor frequency of the MEMS sensor without the support member 104. But, by coupling the printed circuit assemblies 116 to the support member 104 and selectively arranging the spokes 130 and spaces 132, the operating frequency of the package assembly 100 may be further separated or optimized from the sensor frequency, which in turn may increase one or more performance characteristics of the MEMS sensor because the separation of the respective frequencies reduces the likelihood that the sensor frequency may overlap with the operating frequency of the package assembly 100.

Figure 2:
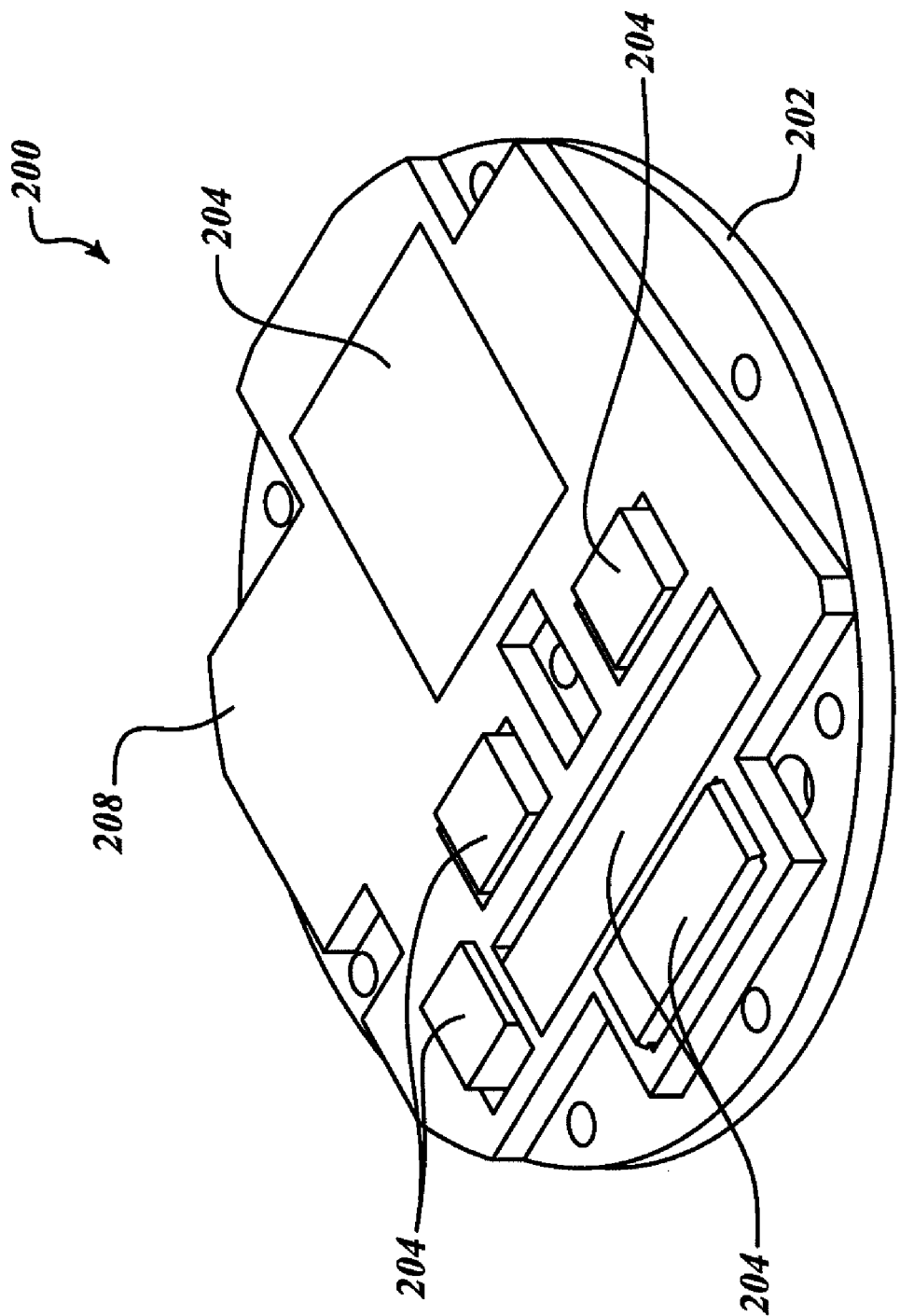
FIG. 2 is an isometric view of a packaging assembly having a printed circuit board coupled to a custom-shaped stiffening member according to an embodiment of the invention.
Figure 3:
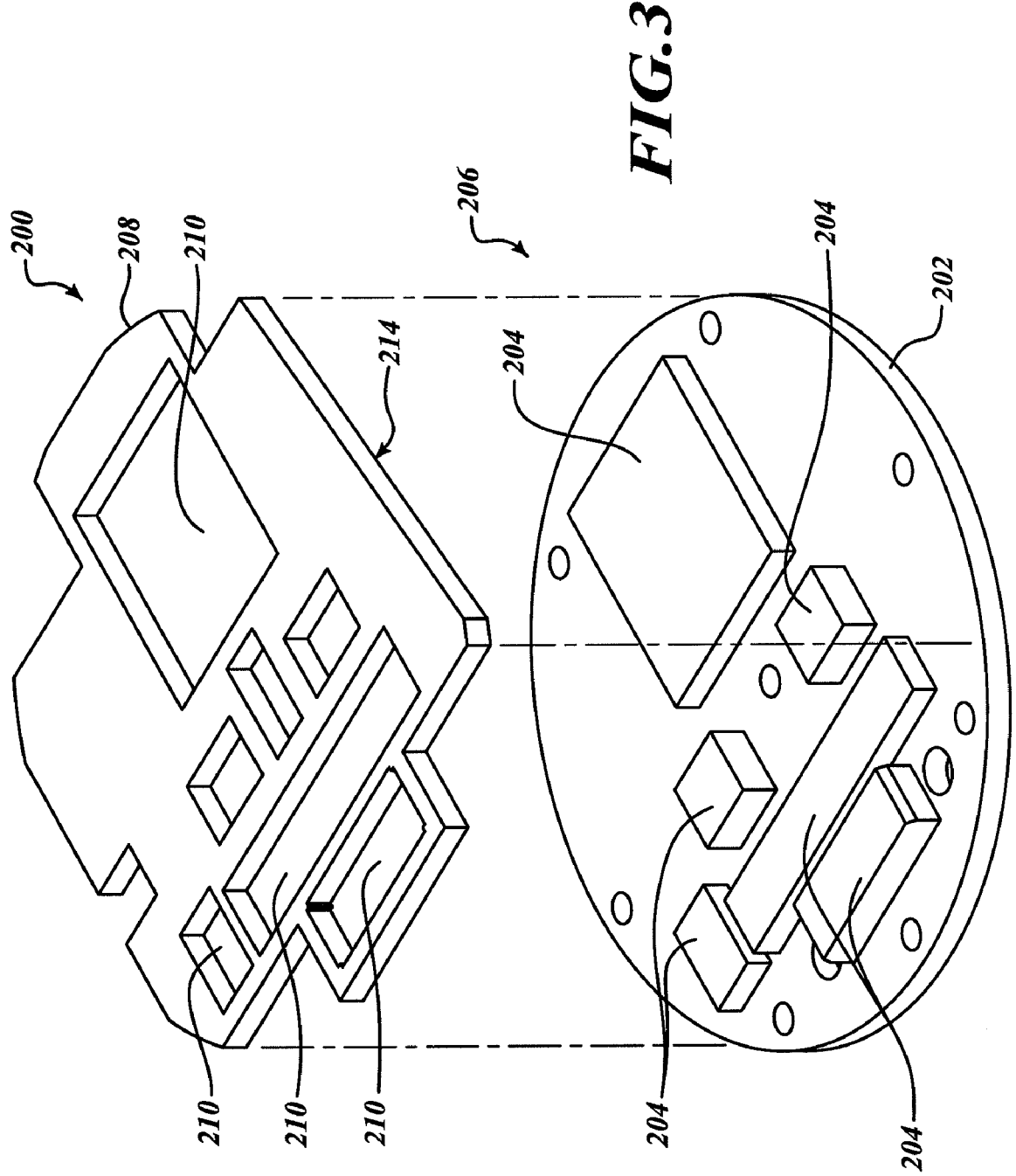
FIG. 3 is an isometric, exploded view of the packaging assembly of FIG. 2.

FIGS. 2 and 3 show a package assembly 200 having a printed circuit board 202 with electrical components 204 to form a printed circuit assembly 206 where the electrical components 204 are selectively arranged with a stiffening member 208. In the illustrated embodiment, the stiffening member 208 may be molded, machined, laminated or otherwise processed into the desired complex shape, which in turn takes advantage and cooperates with the arrangement of the electrical components 204 of the printed circuit assembly 206. By way of example, openings 210 in the stiffening member 208 correspond to the shape and placement of the electrical components 204 located on the printed circuit board 202. In one embodiment, a thickness of the stiffening member 208 is substantially equal to a height of the deepest (i.e., tallest) electrical component 204. In another embodiment, the thickness of the stiffening member 208 is different than the height of the deepest electrical component 204.

The stiffening member 208 may be attached to a surface 212 of the printed circuit board 202 with adhesive, solder, or some other mechanical attachment means. If soldered, a bottom surface 214 of the stiffening member 208 may include a metalized or metallic layer (not shown), which may take the form of a coating or film. In another embodiment, the stiffening member 208 may include protruding metal pins (not shown) that are soldered into plated holes (not shown) in the printed circuit board 202. The pins could also operate as connectors to mechanically couple two adjacent printed circuit boards 202.

The cross section of the stiffening member 208 may be selected to maximize the free space on the printed circuit board 202 not occupied by the electrical components 204. Further, the cross section of the stiffening member 208 may be customized to take advantage of varied electrical component heights to maximize or otherwise customize a moment of inertia of the package assembly 200.

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The embodiments of the invention in which an exclusive property or privilege is claimed are defined as follows:

1. A packaging assembly comprising:
   a printed circuit board having first board surface separated by a second board surface to define a board thickness;
   a plurality of electrical components formed on at least one of the first and second surfaces of the printed circuit board to form a printed circuit assembly, the electrical components extending from the one of the first and second surfaces to define a maximum board height for the printed circuit assembly; and
   a support member coupled to the printed circuit assembly, the support member having a central hub coupled to a rim with a plurality of spokes having spaces located therebetween, the spokes arranged to receive the plurality of electrical components of the printed circuit assembly without interfering with the electrical components;
   the spoke and spaces further arranged on the support member such that an operating frequency of the packaging assembly avoids overlap with a sensor frequency of at least one Microelectromechanical (MEMS) sensor of the plurality of electrical components.

2. The packaging assembly of claim 1, wherein the packaging assembly includes a sensor for a micro-electrical mechanical system.

3. The packaging assembly of claim 1, wherein the spokes extend radially from the central hub to the rim.

4. The packaging assembly of claim 1, wherein the spokes are spaced apart by substantially equal circumferential distances.

5. The packaging assembly of claim 1, wherein the spokes are shaped based on the arrangement of the electrical components and the stiffeners of the printed circuit assembly.

6. The packaging assembly of claim 1, further comprising:
   a retaining ring coupled to the support member with the printed circuit assembly positioned therebetween.

7. The packaging assembly of claim 1, wherein the support member is fastened to the printed circuit assembly.

8. The packaging assembly of claim 1, wherein the support member is bonded to the printed circuit assembly.

9. The packaging assembly of claim 1, wherein the spokes cooperate with the printed circuit assembly to change a resonant frequency of the packaging assembly.

10. The packaging assembly of claim 1, wherein the spokes cooperate with the printed circuit assembly to change a moment of inertia of the packaging assembly.

11. A packaging assembly comprising:
a printed circuit board having first board surface separated by a second board surface to define a board thickness;
a plurality of electrical components extending from at least one of the first and second surfaces of the printed circuit board to form a printed circuit assembly, the electrical components extending from the one of the first and second surfaces;
a stiffening member coupled to the printed circuit assembly, the stiffening member having a plurality of stiffening ribs arranged around openings configured to receive at least one of electrical components of the printed circuit board;
the stiffening ribs further arranged on the stiffening member such that an operating frequency of the packaging assembly avoids overlap with a sensor frequency of at least one Microelectromechanical (MEMS) sensor of the plurality of electrical components.

12. The packaging assembly of claim 11, wherein the stiffening member includes a metalized surface soldered to the printed circuit board.

13. The packaging assembly of claim 11, wherein the stiffening member is bonded to the printed circuit board.

14. The packaging assembly of claim 11, wherein a thickness of the stiffening member is substantially equivalent to a height of at least one of the electrical components extending from one of the first and second surfaces of the printed circuit board.

15. The packaging assembly of claim 11, wherein the stiffening ribs and the opening of the stiffening member are complementarily configured with an arrangement of the electrical components of the printed circuit assembly.

16. The packaging assembly of claim 11, wherein a cross section of the stiffening member is selected to maximize a moment of inertia of the packaging assembly.

* * * * *